Nov. 5, 1963  L. R. BLAKE  3,109,802
NUCLEAR REACTORS
Filed Jan. 11, 1960
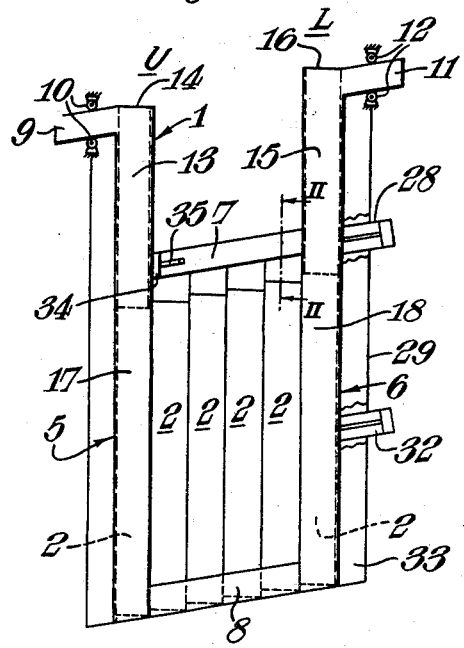
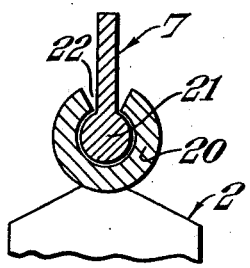
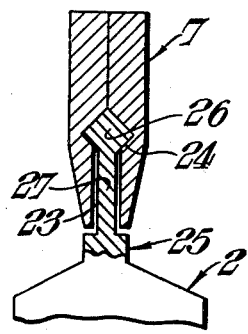
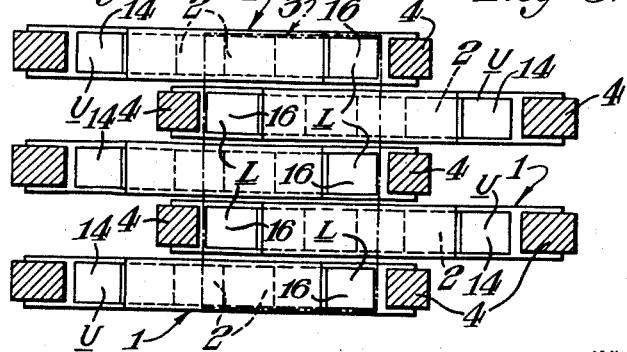
INVENTOR
LESLIE REGINALD BLAKE
BY ical portion of the rail 7 (see FIGURE 2). Alternatively,

United States Patent Office 3,109,802
Patented Nov. 5, 1963

3,109,802
NUCLEAR REACTORS
Leslie Reginald Blake, Thurso, Caithness, Scotland, assignor to United Kingdom Atomic Energy Authority, London, England
Filed Jan. 11, 1960, Ser. No. 1,804
Claims priority, application Great Britain Jan. 12, 1959
5 Claims. (Cl. 204—193.2)

This invention relates to nuclear reactors and it has particular application in reactors of the kind comprising a core of fuel elements adapted to be immersed in a tank of liquid coolant. One such reactor is that known as a fast reactor (F.R.) and another such reactor is that commonly known as a materials testing reactor (M.T.R.). The present invention is concerned especially with the loading and unloading of fuel elements.

According to the present invention, a nuclear reactor comprises a loading station or stations situated in register with the core of the reactor, an unloading station or stations situated outside the boundary of the core, and means for moving fuel elements without withdrawing them between a position in which they register with a loading station and a position in which they register with an unloading station.

The reactor core may be constituted by a plurality of adjacently disposed slab-like members each supporting a number of fuel element blocks arranged side by side in a single line, the fuel element blocks being movable in the said members and being loadable into and removable from the said members at positions registering with the said loading station or stations and the said unloading station or stations respectively.

In addition, the said members may themselves be movable to reduce reactivity during refuelling and/or in order to assist in effecting registration of a refuelling machine for loading and/or unloading.

The said members may comprise frames providing guides for the fuel element blocks and having means for moving the blocks within the frames, with or without releasable locking means for securing fuel blocks against movement relative to the frames.

The said frames may each have a supporting rail from which the respective fuel blocks are suspended so as to be capable of being moved along the rail by the said means when desired.

A constructional example embodying the invention will now be described with reference to the accompanying partly diagrammatic drawings, wherein—

FIGURE 1 is an elevation of a fuel element assembly frame for a fast reactor, having applied to it means for manipulating fuel element blocks, FIGURE 2 is a detached fragmentary section on line II—II of FIGURE 1 and illustrates a detail, FIGURE 3 is a similar view to FIGURE 2 and illustrates a modification, and FIGURE 4 is a plan view showing frames arranged adjacently to form a reactor core.

Referring to the drawings, in the construction shown therein, as applied to a fast reactor, that is, a nuclear reactor employing fast neutrons for a chain fission reactions in fissionable fuel and therefore employing no moderator, a fuel element assembly frame 1 is of slab-like form and is capable of being disposed adjacent other similar frames, alternate frames being turned through 180° and adjacent frames being overlapped in staggered manner as shown in FIGURE 4 to aggregate the fuel into a reactive core configuration. Each frame contains a number of nuclear fuel blocks 2, and overlapping fuel blocks constitute the core whose boundary is shown by the dotted line 3 in FIGURE 4. The frames 1 are supported on pillars 4 so as to be capable of sliding movement relative to adjacent frames and are immersed in a tank of liquid coolant.

Considering now an individual frame 1, see particularly FIGURES 1 and 2, the frame 1 has two upright hollow posts 5 and 6 respectively, joined by a cross member 7 intermediate their ends and by another cross member 8 at their feet. The post 5 has an inclined arm 9 supported by rollers 10 in a pillar 4 and the post 6 has an inclined arm 11 supported by rollers 12 in another pillar 4, this manner of support ensuring gravitational bias of the frame in the direction to reduce reactivity. The portion 13 of the post 5 above the cross member 7 is totally enclosed except for a top aperture 14 (see FIGURE 4) communicating with the hollow interior of the post 5. Likewise, the post 6 has that portion 15 which is disposed above the cross member 7 formed similarly, with a top aperture 16 (see FIGURE 4) communicating with its hollow interior. The portion 17 of the post 5 between the cross members 7 and 8 and the similar portion 18 of the post 6 have their opposed sides open so that a fuel block can be moved sideways into position within the portion 17 and be moved endwise upwardly within the post 5 to leave by the aperture 14 therein; conversely, a fuel block can be passed endwise into the post 6 via its aperture 16, be lowered and then be moved sideways out of the portion 18. It will be seen that this arrangement enables fuel blocks 2 to be loaded into and out of the frame 1 at stations which are fixed in relation to the frame.

The fuel blocks 2 are movable sideways within the frame 1 and to this end are suspended from the cross member 7, which functions as a monorail. Each fuel block 2 has a hollow cylindrical bearing member 20 mounted at its upper end and engageable for sliding movement with a cylindrical portion 21 of the rail 7. The member 20 has a slot 22 for passage of the non-cylindrical portion of the rail 7 (see FIGURE 2). Alternatively, as shown in FIGURE 3, the monorail 7 may be in two portions which when secured together define an internal groove having a portion 23 which is of rectangular cross-section and a portion 24 which runs into the portion 23 and is of diamond-shaped cross-section. A spigot 25 mounted at the top of each fuel block 2 is shaped so as to have a portion 26 capable of engaging for sliding movement within the portion 24, the neck 27 of the spigot engaging the portion 23 with clearance. As can be seen from FIGURE 1, the monorail 7 is inclined so that the fuel blocks tend to move down the rail 7 (from right to left in FIGURE 1) from the loading station (indicated generally by the reference character L in FIGURES 1 and 4) to the unloading station (indicated generally by the reference character U in FIGURES 1 and 4).

In the normal way, when the reactor is in operation, each frame 1 will contain its full complement of fuel blocks 2, the monorail 7, which is extendable in length to a small extent by a portion 34, having all the fuel blocks 2 except that within the portion 18 of the post 6 suspended therefrom, and providing hold-down against upward coolant flow.

The loading of the fuel blocks on to the monorail is effected by a mechanism 33 which is inserted in a hollow column 29 at the side of the post 6. The mechanism operates a plunger 28 which during reloading transports the adjacent fuel block and loads it on to the monorail, and when a new fuel block is inserted it locks the latter in position against displacement by hydraulic force exerted by the coolant flow. The mechanism also contains a second plunger 32 which provides a constant pressure to the fuel blocks at their centre to prevent inward fuel element bowing which can give rise to a positive power coefficient of the reactor. The pressure also allows fuel elements to swell under controlled conditions. The plunger 32 is also utilized during loading to assist in moving over a fuel block 2 onto the rail 7. The mechanism 33 is only operated during loading and unloading and during reactor operation it is locked in position with plunger 28 extended to lock fuel block 2 and with plunger 32 pressing against fuel block 2 at constant pressure. The plungers 28, 32 can be operated mechanically, for example by rack and pinion means, or can be fluid-operated.

The method of unloading fuel is to bring the nose of the refuelling machine (not shown) into register with aperture 14 of post 5 of frame 1, in which it is desired to change fuel. The nose is lowered into portion 13 of post 5 until it abuts the supporting member 20 or 27 of the fuel block 2 beneath. In this position the said fuel block 2 is supported over just half of the length of its supporting member by an extendable section 34 of monorail 7, which extends supported by guide arms 35. The grappling mechanism takes hold of the supporting member 20 or 27 of the said fuel block 2 and at the same time slides back extendable section 34. The fuel block can now be withdrawn out of the post 5 and removed to a suitable storage facility. Because the fuel block 2 is being withdrawn at a location outside the core boundary, the risk of melt down due to fission product heating is remote. As soon as the fuel block 2 has left the portion 17, the extendable section 34 is free to move for the next fuel block 2. Next, the plungers 28 and 32 are operated together to move all the remaining fuel blocks 2 down the monorail 7. The fuel block 2 adjacent to the space vacated by the removed fuel block 2 is moved over by operation of the mechanism 33 to fill this space supported by extendable section 34, which slides over with the moving fuel. By use of both plungers, full control over the fuel blocks 2 as they are moved, possibly in full flow of liquid metal coolant, is assured. The result of moving the fuel blocks 2 is to cause the next block 2 to the one removed to occupy the portion 17 of the post 5 and to vacate the portion 18 of the post 6 ready for insertion of a fresh fuel block. Whilst retaining the plunger 32 in contact with the nearest fuel block 2, the plunger 28 is withdrawn, and the refuelling machine nose, engaged with the fresh fuel block 2, is inserted endwise into the aperture 16 and lowered into position, the plunger 32 being withdrawn as the fresh block approaches it. When in position, the plungers 28 and 32 are engaged with the fresh block 2 so that the whole assembly of fuel blocks is firmly held.

If desired, the frames 1 can be themselves moved outwardly to reduce reactivity during loading or unloading operations.

By suitable loading and unloading techniques with fuel blocks, i.e. "shuffling" fuel blocks, burn-up can be made more uniform in the reactor. By the confining of loading and unloading to regions, as evident from FIGURE 4, more space is provided above the core for detection of burst fuel cans and for instrumentation for temperature determination etc. Furthermore, fuel blocks are unloaded at a low flux and low power position, which is advantageous in that the withdrawal of a fuel block has little effect on reactivity.

Whilst the invention has been described above with reference to the fast reactor construction shown in the drawings, it also has a closely similar application in a materials testing reactor.

I claim:
1. In a nuclear reactor having a core wherein nuclear fuel in the form of discrete fuel elements is employed, structure comprising a plurality of guiding means respectively defining separate paths of travel through the core for said elements which paths have mutually adjacent straight parallel sections overlapping one another lengthwise to position said fuel elements at such portions of adjacent paths in side by side relationship for aggregating into a reactive core configuration, a loading station and an unloading station associated with each set of guiding means and registering with the respective means at differing locations for the transfer of said fuel elements to and from such means, the locations of the unloading stations being other than at said overlapping portions, and means for moving said fuel elements along said guiding means.

2. In a nuclear reactor structure having a core wherein nuclear fuel in the form of discrete fuel elements is employed, structure comprising a plurality of guiding means respectively defining straight line separate parallel paths of travel for said elements through the core, said paths having mutually adjacent lengthwise overlapping portions at which fuel elements are brought in side by side relationship for aggregation into a reactive core configuration, a loading station registering with each guiding means adjacent to the overlapping end of the path defined thereby for the transfer of elements to the guiding means and an unloading station registering with each guiding means adjacent the other end of the path defined thereby for the transfer of elements from the guiding means, and means for moving said fuel elements along said guiding means.

3. In a nuclear reactor structure having a core wherein nuclear fuel in the form of elongated fuel elements is employed, structure comprising guiding means for guiding fuel elements through the core, without change of attitude, traversely of the longitudinal direction of said elements along a plurality of paths of which only certain portions overlap longitudinally for aggregating fuel elements in a reactive core configuration, a fuel element loading station associated with each of said paths, an unloading station also associated with each of said paths and registering with the respective path other than at the overlapping portion thereof, and means for moving said fuel elements along said guiding means.

4. In a nuclear reactor structure for employing in a core region nuclear fuel in the form of elongated fuel elements, the combination comprising a plurality of rails individually adapted for supporting fuel elements suspended in an upright attitude in a single line and collectively disposed so that a parallel side by side relationship of each rail with adjacent rails exists only over lengthwise overlapping portions of said rails, said overlapping portions of said rails serving to aggregate fuel elements in a reactive configuration in said core region, a loading and an unloading station disposed at opposite ends of each of said rails for the transfer of fuel elements in their longitudinal directions respectively to and from the respective one of said rails, said unloading station being registered with the rail other than at the overlapping portion thereof, and means for moving said fuel elements along said rail.

5. In a nuclear reactor structure for employing nuclear fuel in the form of elongated fuel elements in a core region, the combination comprising a plurality of juxtaposed parallel sided fuel element holding frames extending across said core region, a rail included in each of said frames for supporting fuel elements suspended in upright attitude in a single line, each of said frames being adapted, at an end nearer than the other to the center of the core region, for the transfer of fuel elements in their longitudinal directions to the respectively appertaining rails and being adapted at the other for the withdrawal of fuel elements, also in their longitudinal directions, from the rail, and means for moving said fuel elements along said rail.

References Cited in the file of this patent
UNITED STATES PATENTS 2,708,656    Fermi                   May 17, 1955
2,809,157    Metcalf                Oct. 8, 1957

OTHER REFERENCES
Glasstone, Principles of Nuclear Reactor Engineering, 1955, page 48, Princeton, N.J.